United States Patent [19]

Komatsu et al.

[11] Patent Number: 4,874,633
[45] Date of Patent: Oct. 17, 1989

[54] METHOD OF PRODUCING MAGNETIC RECORDING MEDIUM

[75] Inventors: Kazunori Komatsu; Hiroshi Chikamasa; Tsunehiko Sato, all of Kanagawa, Japan

[73] Assignee: Fuji Photo Film Co., Ltd., Kanagawa, Japan

[21] Appl. No.: 919,941

[22] Filed: Oct. 17, 1986

[30] Foreign Application Priority Data

Oct. 18, 1985 [JP] Japan .................................. 60-231097

[51] Int. Cl.$^4$ ............................................. H01F 10/02
[52] U.S. Cl. ..................................... 427/48; 427/131; 428/694; 428/900
[58] Field of Search ................... 427/48, 131; 428/900, 428/694

[56] References Cited

U.S. PATENT DOCUMENTS 3,920,862 11/1975 Damschroder et al. ............ 427/131

FOREIGN PATENT DOCUMENTS 53-144705 12/1978 Japan .
1416200 12/1975 United Kingdom .

Primary Examiner—Bernard Pianalto
Attorney, Agent, or Firm—Sughrue, Mion, Zinn, Macpeak & Seas

[57] ABSTRACT

A method of producing a magnetic recording medium comprises forming a magnetic layer by applying a magnetic film forming liquid onto a continuously running non-magnetic support, applying a magnetic field onto the magnetic film forming liquid before the magnetic film forming liquid has dried, and then drying the magnetic film forming liquid. A non-magnetic undercoating layer is formed on the support simultaneously with the step of forming the magnetic layer by simultaneously applying to the support a non-magnetic undercoating forming liquid and the magnetic film forming liquid. The magnetic field is applied before both the magnetic film forming liquid and non-magnetic undercoating forming liquid have dried.

2 Claims, 2 Drawing Sheets

METHOD OF PRODUCING MAGNETIC RECORDING MEDIUM

FIELD OF INVENTION

The present invention generally relates to a method of producing a magnetic recording medium, and more particularly to a method of producing a magnetic medium which is suitable for use in producing a magnetic medium having a thin magnetic layer having a thickness not larger than 2 μm when dried.

BACKGROUND OF THE INVENTION

Generally, a magnetic recording medium such as a magnetic disck, a magnetic tape, etc., is produced in such a manner that a magnetic film forming liquid containing ferromagnetic fine particles dispersed in a bonding agent dissolved by a solvent is applied onto a belt-like non-magnetic support while continuously longitudinally conveying the support, the applied liquid is dried to harden, and the support is stamped out or cut.

In producing a magnetic tape, however, it is necessary to arrange the magnetic particles in the running direction of the non-magnetic support to increase the square ratio (the amount of residual magnetization Br divided by the saturation magnetization Bm) of an applied magnetic film, in order to increase the sensitivity of the tape to thereby improve the S/N ratio of the same. Accordingly, in the case of producing a magnetic tape, or the like, conventionally, there has been used a method in which a magnetic field in the conveying direction of a non-magnetic support is applied by a permanent magnet or a solenoid onto an applied liquid film before the applied liquid film has dried, so as to make the direction of the easily magnetizing axis of the magnetic particles agree (orientate) with the running direction of the support.

In producing a magnetic disk, on the other hand, if ferromagnetic fine particles are arranged in a specified direction during the production of the magnetic disk so as to produce an anisotropy in the magnetic medium, an anisotropy is generated also in each of the magnetic characteristics and electric characteristics in various directions. For example, if the magnetic particles are arranged in the direction of application of a magnetic forming liquid (that is, in the running direction of the non-magnetic support), the level of a reproducing output signal becomes higher in the direction of application of the magnetic film forming liquid than those in the other directions, so that the reproducing output signal level read out from the magnetic disk varies in accordance with the rotation of the disk. This phenomenon is generally called "modulation". Accordingly, in the case of producing a magnetic disk or the like, conventionally, there has been used a method in which a magnetic field is applied to an applied magnetic film forming liquid before the applied liquid has dried in a manner so as to disorder or randomize the orientation of the magnetic particles, in order to solve the above-mentioned problem that linearity occurs in the magnetic particles due to the fluid orientation in applying the magnetic film forming liquid.

Recently, there has been a strong demand to increase the memory capacity of magnetic storage means, that is, magnetic disks or magnetic tapes.

In order to increase the memory capacity, needless to say, the recording density per unit area of the magnetic recording medium must be increased.

Further, in order to increase the recording density, the writing magnetic flux generated from a magnetic head must be concentrated into a minute area, and therefore the magnetic head is miniaturized so that the amount of magnetic flux generated by the head decreases. Accordingly, the volume of the magnetic recording layer in which the direction of magnetization can be reversed by the thus decreased minute amount of magnetic flux is also decreased, so that it is impossible to produce complete reversal of magnetization unless the magnetic recording layer is decreased in thickness.

In order to satisfy the requirements as described above, accordingly, it becomes necessary to make the magnetic recording layer thinner.

PROBLEM TO BE SOLVED BY THE PRESENT INVENTION

The above-mentioned conventional method of producing a magnetic recording medium was applied to a thin applied magnetic layer having a thickness of 2 μm or less in a dried state, and it has been found that the characteristics, that is, the modulation and the square ratio were not much improved in comparison with the case where the same method was applied to an applied magnetic film having a thickness larger than 2 μm. As the result of investigations as to why there was not improvement, it has been found that the surface area is comparatively large relative to the amount (volume) of the magnetic forming liquid in the case of a thin magnetic film forming layer having a thickness of 2 μm or less, and the rate of decrease per unit time of the magnetic film forming liquid is large due to evaporation of the solvent in the magnetic film forming liquid so that the viscosity of the applied film increases before the application of the magnetic field onto the applied film and it becomes difficult for the magnetic particles to move.

Further, in producing a magnetic recording medium having a double-layered structure by applying a thin magnetic layer onto an already dried layer, it has been found that the solvent in the magnetic film forming liquid is absorbed into the undercoating layer, so that the viscosity increases rapidly and it becomes difficult for the magnetic particles to move, in addition to the foregoing phenomenon.

SUMMARY OF THE INVENTION

It is an object of the present invention to provide an improved method for producing a magnetic recording medium which eliminates the above-mentioned disadvantages.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a method of producing a magnetic recording medium by forming a magnetic layer by the steps of applying a magnetic film forming liquid onto a continuously running non-magnetic support, applying a magnetic field onto the magnetic film forming liquid before the magnetic film forming liquid has dried, and then drying the magnetic film forming liquid, in which there is an improvement comprising: forming a non-magnetic undercoating layer on the support simultaneously with the step of forming the magnetic layer by simultaneously applying to the support a non-magnetic undercoating forming liquid and the magnetic film forming liquid, and applying the magnetic field before both the magnetic film forming liquid and non-magnetic undercoating forming liquid have dried.

It is to be understood that both the foregoing general description and the following detailed description are exemplary and explanatory, but are not restrictive of the invention.

DETAILED DESCRIPTION OF THE INVENTION

The present invention will be described in detail hereunder.

Figure 1:
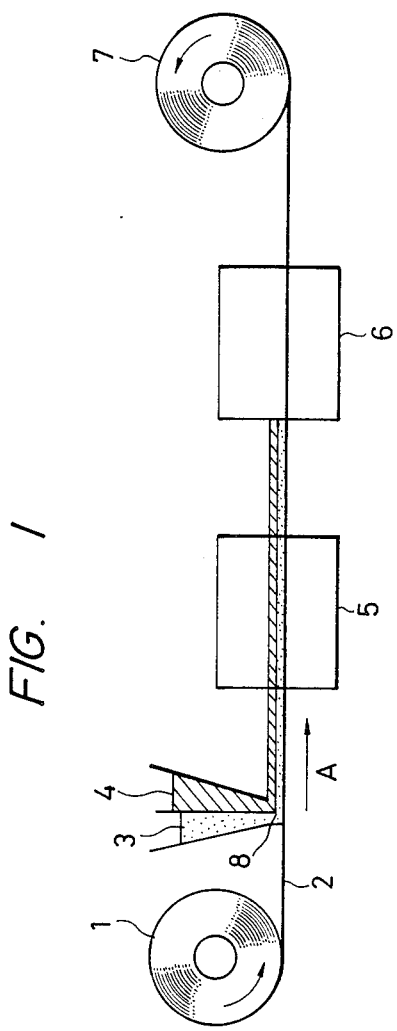
FIG. 1 is a schematic view showing an embodiment of a magnetic recording medium producing apparatus which can be used to practice the method according to the present invention.

FIG. 1 shows an embodiment of an apparatus for producing a magnetic recording medium according to the present invention. An elongated belt-like non-magnetic support 2 wound on a feed roller 1 is continuously fed in the direction of an arrow A and taken up by a take-up roller 7. In close vicinity to the location where the nonmagnetic support is being fed, a multilayer simultaneous application device 8 is arranged to apply an undercoating forming liquid 3 and a magnetic film forming liquid 4 at the same time onto the surface of the non-magnetic support 2 to thereby form a non-dried multilayer structure.

A device 5 for performing orientation or randomization of orientation by the application of a magnetic field is disposed downstream from the multilayer simultaneous application device 8 in the support feeding direction A, and a dryer 6 is provided further downstream. The magnetic particles in the magnetic layer of the two non-dried layers formed on the non-magnetic support 2 in such a manner as described above, are orientated in the non-magnetic support feeding direction or randomized when the particles pass through the device 5 in a non-dried state, and then the non-dried double layers are dried to be hardened when they pass through the dryer 6, to thereby obtain a sheet-like magnetic recording medium in which the double magnetic recording layer structure including the above-mentioned layer of magnetic particles is formed on the non-magnetic support 2. The thus obtained magnetic recording medium is then stamped out or cut to thereby obtain a magnetic disk, a magnetic tape, or the like.

As the magnetic film forming liquid described above, a dispersion liquid in which ferromagnetic powder is dispersed in a solution of a binder such as a copolymer of Vinyl chloride and Acrylonitrile, a copolymer of Vinyl chloride and Acrylic ester, or the like, dissolved in an organic solvent such as Methyl ethyl ketone, Cyclohexanone, Toluene, Methyl isobutyl ketone or the like, is used. As an undercoating forming liquid, a non-magnetic film forming liquid such as a solution of a film forming material, such as nitrocellulose or the like, dissolved in an organic solvent such as Methyl ethyl ketone, Cyclohexanone, Toluene, Methyl isobutyl ketone or the like, is used. In this case, it is desirable that both the dispersion liquid and the non-magnetic film forming liquid contain a common solvent.

Further, the present invention can be applied to the producing of not only a magnetic recording medium of the conventional system, but a so-called vertical magnetization type magnetic recording medium having an easily magnetizing axis in the direction perpendicular to the surface on which liquid is applied.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Magnetic disks are produced through the steps of forming a magnetic layer of 1 μm thick onto a surface of a base of polyethylene terephthalate (PET) of 7.5 μm thick, performing randomization of orientation of magnetic particles by means of a bar-like orientation magnet arranged slantingly relative to the feeding direction of the structure of the base with the magnetic layer, drying the structure, and stamping-out the structure. Three different methods were used to carry out the above steps which differed from each other in the following details. In the first method, only the magnetic layer of 1 μm thick was directly applied onto the PET base. In the second method, the magnetic layer of 1 μm was applied on an undercoating layer which had been applied and had already dried on the PET base. In the third method, the magnetic layer together with an undercoating layer were applied by means of a multilayer simultaneous application in accordance with the present invention. The difference in randomization of the magnetic particles among the above-mentioned three cases were tested measuring the "ratio of orientation degree" of the respective magnetic layer in each of the three cases. The term "ratio of orientation degree" (orientation degree ratio) is defined as the ratio of the minimum value of square ratio (SQmin.) to the maximum value of square ratio (SQmax.) obtained by measuring the square ratio (SQ) every 30 degrees in the surface of the magnetic layer. An increase in the ratio of orientation degree (SQmin./SQmax.) toward 100% indicates the fact that the randomization of the magnetic particles has increased.

The components of the magnetic liquid and the undercoating layer liquid used in this Example were as shown in the following Table.

| Magnetic Film Forming Liquid | |
| --- | --- |
| $\gamma$-$Fe_2O_3$ | 400 parts |
| Polyurethane ( Nipporan 3022 ) | 60 parts |
| Copolymer of vinyl chloride and vinyl acetate (VMCH) | 40 parts |
| Lecithin | 4 parts |
| Stearic acid | 5 parts |

| -continued | |
|---|---|
| Carbon | 30 parts |
| Methyl ethyl ketone | 500 parts |
| Methyl isobutyl ketone | 200 parts |
| Cyclohexanone | 200 parts |
| Undercoating Forming Liquid | |
| Methyl ethyl ketone | 100 parts |
| Toluene | 100 parts |
| Nitrocellulose | 5 parts |

Figure 2:
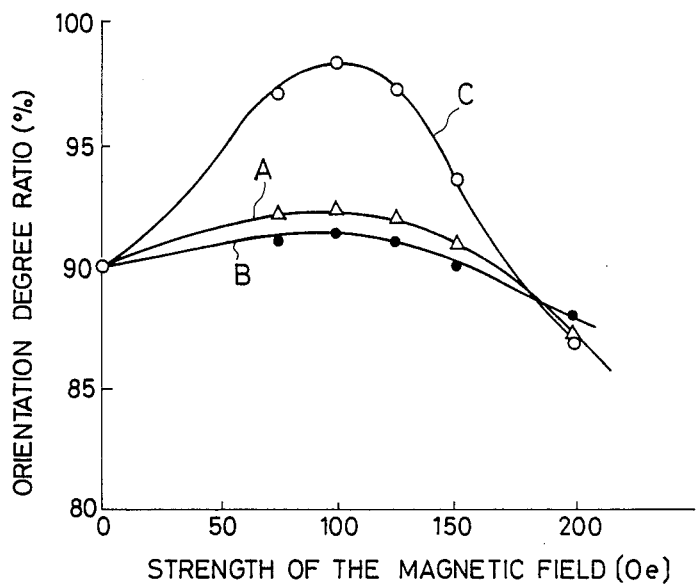
FIG. 2 is a graph showing the relationship of the orientation degree ratio versus the strength of the magnetic field of the magnetic disk obtained in Example 1 of the specification.

FIG. 2 shows the relationship between the above-mentioned ratio of orientation degree and the strength of the magnetic field of the bar-like orientation magnet used for randomizing the magnetic particles. In graph, the symbols A, B, and C show the respective results in the case where only the magnetic layer was applied, in the case where the magnetic layer was applied onto the undercoating layer which had been dried, and in the case where the double layers were applied simultaneously.

As shown in the graph, when the thickness of the magnetic layer is selected to be about 1 μm, the evaporation of solvent in the magnetic application liquid as well as the absorption of the same into the undercoating layer were effected violently, and the effect of the simultaneous application of the double layers appeared remarkably.

EXAMPLE 2

Magnetic tapes are produced through the steps of applying a magnetic layer of 1 μm thick onto a surface of a PET base of 14 μm thick, orientating magnetic particles in the direction of conveyance of the laminated structure by means of a solenoid coil arrangement, drying the structure, and cutting the structure. Three different methods were used to carry out the above steps which differed from each other in the following details. In the first method, only the magnetic layer of 1 μm thick was directly applied onto the PET base. In the second method, the magnetic layer of 1 μm was applied on an undercoating layer which had been applied and had already dried on the PET base. In the third method, the magnetic layer and an undercoating layer were applied by means of a multilayer simultaneous application in accordance with the present invention. The difference in orientation of the magnetic particles among the above-mentioned three cases was tested by mesuring the square ratio in the direction of movement with respect to the magnetic layer in each of the three cases.

The components of the magnetic liquid used in this Example 2 were as shown in the following Table and the components of the undercoating layer liquid were the same as those used in Example 1.

| Magnetic Film Forming Liquid | |
|---|---|
| Co-containing γ-Fe$_2$O$_3$ | 100 parts |
| Nitrocellulose | 10 parts |
| Polyurethane (Nipporan 2304) | 8 parts |

| -continued | |
|---|---|
| Polyisocyanate | 8 parts |
| Cr$_2$O$_3$ | 2 parts |
| Carbon | 2 parts |
| Stearic acid | 1 part |
| Butyl stearate | 1 part |
| Methyl ethyl ketone | 300 parts |

Figure 3:
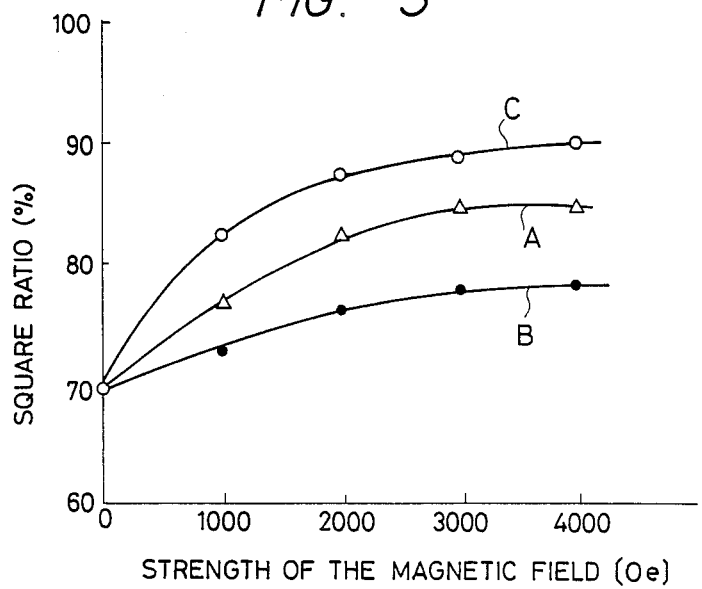
FIG. 3 is a graph showing the relationship of the square ratio versus the strength of the magnetic filed of the magnetic tape obtained in Example 2 of the specification.

FIG. 3 shows the relationship between the square ratio (SQ) and the strength of the magnetic field of the solenoid coil used for the orientation of the magnetic particles in the direction of movement. In the graph, the symbols A, B, and C show the respective results in the case where only the magnetic layer was applied, in the case where the magnetic layer was applied onto the undercoating layer which had been dried, and in the case where the double layers were applied simultaneously.

Similarly to the results of Example 1, when the thickness of the magnetic layer is selected to be about 1 μm, the evaporation of solvent in the magnetic film forming liquid as well as the absorption of the same into the undercoating layer were effected violently, and the effect of the simultaneous application of double layers appeared remarkably. The results of the examples (1 and 2) were obtained by employment of a magnetic layer of 1 μm. However, the same results were obtained on condition that the thickness of a magnetic layer is not larger than 2 μm.

Thus, according to the present invention, as described above in detail, the orientation of the magnetic particles in the thin magnetic layer and the randomization of the orientation are performed very well, so that it is possible to form high performance magnetic media such as magnetic tapes improved in sensitivity and in SN ratio, magnetic disks of low modulation and so forth.

It will be understood that the above description of the present invention is susceptible to various modifications, changes and adaptations, and the same are intended to be comprehended within the meaning and range of equivalents of the appended claims.

We claim:

1. In a method for producing a magnetic recording medium by forming a magnetic layer by the steps of applying a magnetic film forming liquid onto a continuously running non-magnetic support, applying a magnetic field onto the magnetic film forming liquid before the magnetic film forming liquid has dried, and then drying the magnetic film forming liquid, the improvement comprising: forming a non-magnetic undercoating layer on the support simultaneously with forming the magnetic layer by simultaneously applying to the support a non-magnetic undercoating forming liquid and the magnetic film forming liquid, and applying the magnetic field before both the magnetic film forming liquid and non-magnetic undercoating forming liquid have dried, and wherein the magnetic layer is formed with a thickness of no more than 2 microns.

2. Method according to claim 1, wherein the magnetic layer is formed with a thickness of about 1 micron.

* * * * *